United States Patent Office 2,937,168
Patented May 17, 1960

2,937,168

3-OXYGENATED ANDROSTENA [16,17-c]-3'-METHYLPYRAZOLES AND DERIVATIVES

Raymond M. Dodson, Park Ridge, Ill., assignor to G. D. Searle & Co., Chicago, Ill., a corporation of Delaware No Drawing. Application June 17, 1959
Serial No. 820,864

5 Claims. (Cl. 260—239.5)

The present invention is concerned with novel steroidal pyrazoles in which the pyrazole ring is fused at the 16- and 17-positions of the steroid nucleus. These compounds are designated more particularly as androstena[16,17-c]-pyrazoles and can be represented by the structural formulae

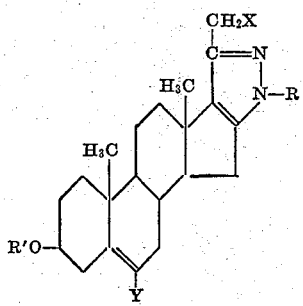

and

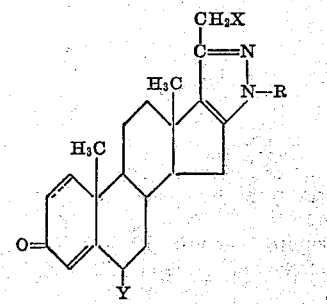

wherein R and R' are members of the group comprising hydrogen and lower alkanoyl radicals, X is a member of the group comprising hydrogen, hydroxy and lower alkanoyloxy radicals and Y is a member of the group comprising hydrogen, halogen atoms of atomic weight less than 100, and lower alkyl radicals; and the dotted line in the 1,2-position represents the optional presence of a doubly-bonded linkage.

It will be recognized by those skilled in the art that the above representation is not meant to limit this invention to those compounds having the pyrazole ring structure as shown, due to the fact that pyrazoles can exist in two tautomeric forms. This tautomerization involves the migration of a hydrogen atom with concomitant shift of a double bond as shown below:

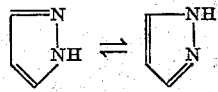

Likewise, the compounds in which R is a lower alkanoyl radical can result from either of the tautomeric forms.

Lower alkyl groups which Y can represent are, for example, methyl, ethyl, propyl, butyl, pentyl, hexyl, heptyl, octyl, and the branched-chain isomers thereof. The lower alkanoyl radicals represented by R are typified by formyl, acetyl, propionyl, butyryl, valeryl, caproyl, enanthyl, caprylyl, and the branched-chain isomers thereof, said groups being the acyl radicals of alkanoic acids containing fewer than 9 carbon atoms.

The 6-(lower alkyl) compounds of this invention can be manufactured from 6-(lower alkyl)-16α,17α-epoxy-3β-hydroxypregn-5-en-20-ones. Reaction of the latter compounds with hydrazine and potassium hydroxide in a suitable inert solvent medium produces the instant 6-(lower alkyl)-3β-hydroxyandrost-5-ena-[16,17-c] - 3'-methylpyrazoles.

A starting material suitable for the preparation of the instant 6-halo compounds is 3β-acetoxypregna15,16-dien-20-one. This diene can be reacted with an epoxidizing agent such as perbenzoic acid to produce the corresponding 5,6-16,17-diepoxide which is treated with a hydrohalogen acid to afford the 3β-acetoxy-16α,17α-epoxy-6-halo-5-hydroxypregnan-20-one. Dehydration of the latter substances, typically by means of thionyl chloride, results in 3β-acetoxy-16α,17α-epoxy-6-halopregn-5-en - 20 - ones. Treatment of the latter compounds with hydrazine at a temperature of 100–150° for a period of 6–48 hours yields the 3β-acetoxy-6-haloandrost-5-ena-[16,17-c]-3'-methylpyrazoles of this invention.

The instant 3-oxoandrost-4-ena-[16,17-c]-pyrazoles can be manufactured by oxidation of the aforementioned coresponding 3β-hydroxyandrost-5-ena-[16,17 - c] - pyrazoles, for example by the Oppenauer procedure involving reaction with aluminum isopropoxide in cyclohexanone.

It has been found that the preferred compounds in the exercise of this invention are the 3-oxygenated androstena [16,17-c]-3'-methylpyrazoles encompassed by the generic structural formula specified supra. A suitable starting material for the manufacture of these preferred compounds is 16α,17α-epoxy-3β-hydroxypregn-5-en-20-one. Reaction of the latter substance with hydrazine and potassium hydroxide in an inert solvent such as diethylene glycol results in 3β-hydroxyandrost-5-ena-[16,17-c]-3'-methylpyrazole. Esterification of this material, for example with a lower alkanoic acid anhydride and pyridine, yields the corresponding 3-lower alkanoates whereas oxidation of the 3β-hydroxy compounds, typically by the Opennauer method with aluminum isopropoxide in cyclohexanone, affords 3-oxoandrost-4-ena-[16,17-c]-3'-methylpyrazole.

Treatment of the instant 3'-methylpyrazoles, in a suitable halogenating medium such as bromine in carbon tetrachloride, with irradiation results in the corresponding 5,6-dihalo-3'-halomethyl compounds. The latter substances are converted to the 3'-(lower alkanoyl)-oxymethyl pyrazoles of this invention by treatment first with sodium iodide then with the potassium salt of the appropriate lower alkanoic acid. Hydrolysis of these 3'-(lower alkanoyl)oxymethylpyrazoles, typically by treatment with an aqueous solution of potassium bicarbonate in methanol, results in the instant 3'-hydroxymethylpyrazoles.

The compounds of this invention are useful as a result of their valuable pharmacological properties. Thus, they are diuretic agents as evidenced by their ability to promote sodium excretion and also to inhibit the sodium-retaining activity of desoxycorticosterone acetate.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

EXAMPLE 1

3β-hydroxyandrost-4-ena-[16,17-c]-3'-methylpyrazole

A mixture of 2 parts of 16α,17α-epoxy-3β-hydroxy-pregn-5-en-20-one, 2 parts of potassium hydroxide, 2 parts of hydrazine hydrate, and 22 parts of diethylene glycol is heated on the steam bath for about one hour, then distilled to remove hydrazine and water until the temperature of the mixture has reached 195°. The reaction mixture is heated at reflux for about 5 hours, cooled, diluted with ice water and filtered to remove the resulting precipitate. This precipitate is extracted with hot benzene and the extract adsorbed on silica gel. The column is eluted with mixtures of benzene-ethyl acetate containing increasing amounts of ethyl acetate. Those fractions eluted with 100% ethyl acetate, after recrystallization from acetone-cyclohexane, afford pure 3β-hydroxyandrost-4-ena-[16,17-c]-3'-methylpyrazole, M.P. 305–307° (dec.); $[\alpha]_D = -73°$ (chloroform).

EXAMPLE 2

3-oxoandrost-4-ena-[16,17-c]-3'-methylpyrazole

To a solution of one part of 3β-hydroxyandrost-5-ena-[16,17-c]-3'-methylpyrazole in 45 parts of toluene and 15 parts of cyclohexanone is added a solution of 1.5 parts of aluminum isopropoxide in 6.5 parts of toluene. The reaction mixture is heated at reflux for about 20 minutes, cooled, and poured into excess aqueous sodium potassium tartrate. The organic layer is separated and washed with aqueous sodium potassium tartrate. The aqueous washings are combined and extracted with ethyl acetate and this extract combined with the toluene solution. This organic solution is then washed with water and steam-distilled to remove the organic solvents. The resulting solid is extracted with ethyl acetate and the organic solution dried over anhydrous sodium sulfate and concentrated to dryness. Recrystallization of the residue first from acetone-hexane, then from methanol results in 3-oxoandrost-4-ena-[16,17-c]-3'-methylpyrazole, M.P. 311–314° (dec.).

EXAMPLE 3

A mixture of 5 parts of 3β-hydroxyandrost-4-ena-[16,17-c]-3'-methylpyrazole, 25 parts of acetic anhydride, and 50 parts of pyridine is allowed to stand at room temperature for about 24 hours, diluted with ice water and filtered to remove the resulting precipitate. This precipitate is washed with water and recrystallized from acetone to afford 3β-acetoxyandrost-5-ena-[16,17-c]-1'-acetyl-3'-methylpyrazole, M.P. 190–193.5°.

By substituting an equivalent quantity of n-butyric anhydride and otherwise proceeding according to the herein described processes 3β-n-butyroxyandrost-5-ena-[16,17-c]-1'-n-butyryl-3'-methylpyrazole is obtained. This compound displays infrared maxima at 3.4, 3.5, 5.75, and 6.2 microns.

EXAMPLE 4

The acetone filtrate from the recrystallization described in Example 3 is concentrated to dryness in vacuo and the residue crystallized from aqueous methanol containing a small quantity of ammonium hydroxide to afford 3β-acetoxyandrost-5-ena-[16,17-c]-3'-methylpyrazole, M.P. 268–273°; $[\alpha]_D = -55°$ (chloroform).

By substituting the filtrate from the recrystallization of 3β-n-butyroxyandrost-5-ena-[16,17-c]-1'-n-butyryl-3'-methylpyrazole in the herein described process, 3β-n-butyroxy-5-ena-[16,17-c]-3'-methylpyrazole is obtained. It displays maxima in the infrared at 3.1, 3.4, 3.5, 5.75, and 6.2 microns.

What is claimed is:

1. A member selected from the group of compounds of the structural formulae

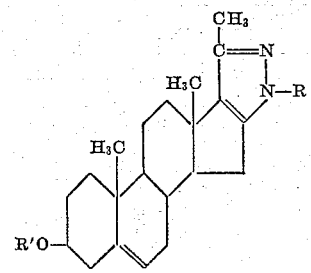

and

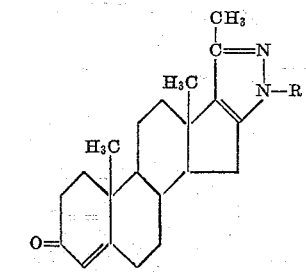

wherein R and R' are selected from the group consisting of hydrogen and lower alkanoyl radicals.

2. 3β-hydroxyandrost-5-ena-[16,17-c]-3'-methylpyrazole.

3. 3-oxoandrost-4-ena-[16,17-c]-3'-methylpyrazole.

4. 3β-acetoxyandrost-5-ena-[16,17-c]-1'-acetyl-3'-methylpyrazole.

5. 3β-acetoxyandrost-5-ena-[16,17-c]-3'-methylpyrazole.

References Cited in the file of this patent

Clinton et al.: J.A.C.S., vol. 81, pages 1513–4 (March 20, 1959).